May 5, 1936.    R. P. SCHLIRF    2,039,983
VEHICLE CONSTRUCTION
Filed March 5, 1934    2 Sheets-Sheet 1

Inventor
Robert P. Schlirf

May 5, 1936.   R. P. SCHLIRF   2,039,983
VEHICLE CONSTRUCTION
Filed March 5, 1934   2 Sheets-Sheet 2

Inventor
Robert P. Schlirf

Patented May 5, 1936

2,039,983

UNITED STATES PATENT OFFICE 2,039,983

VEHICLE CONSTRUCTION

Robert P. Schlirf, St. Paul, Minn.

Application March 5, 1934, Serial No. 714,056

4 Claims. (Cl. 267—19)

My invention relates to vehicle construction and has for an object to provide a construction by means of which a vehicle provided with a transverse leaf spring may be supported for independent action of the wheels.

Another object of the invention resides in providing vehicle construction in which existing vehicles utilizing transverse leaf springs may be readily reconstructed to provide independent action for the wheels.

An object of the invention resides in providing, in conjunction with the vehicle frame and the wheel mounting for a supporting wheel of the vehicle, a pair of links pivoted to the frame and to the wheel mounting and arranged one above the other, and in further providing a spring acting between the frame and the lower link.

Another object of the invention resides in providing, in conjunction with a vehicle frame having a transverse frame member, a bearing block situated below the transverse frame member and in pivoting said links to said bearing block.

A feature of the invention resides in attaching a plate to the bearing block for use in clamping the leaf spring to the transverse frame member of the frame.

Another object of the invention resides in constructing the upper link with two spaced arms and in causing the spring to extend through the space between the arms.

Other objects of the invention reside in the novel combination of parts and in the details of construction thereof.

Figure 1:
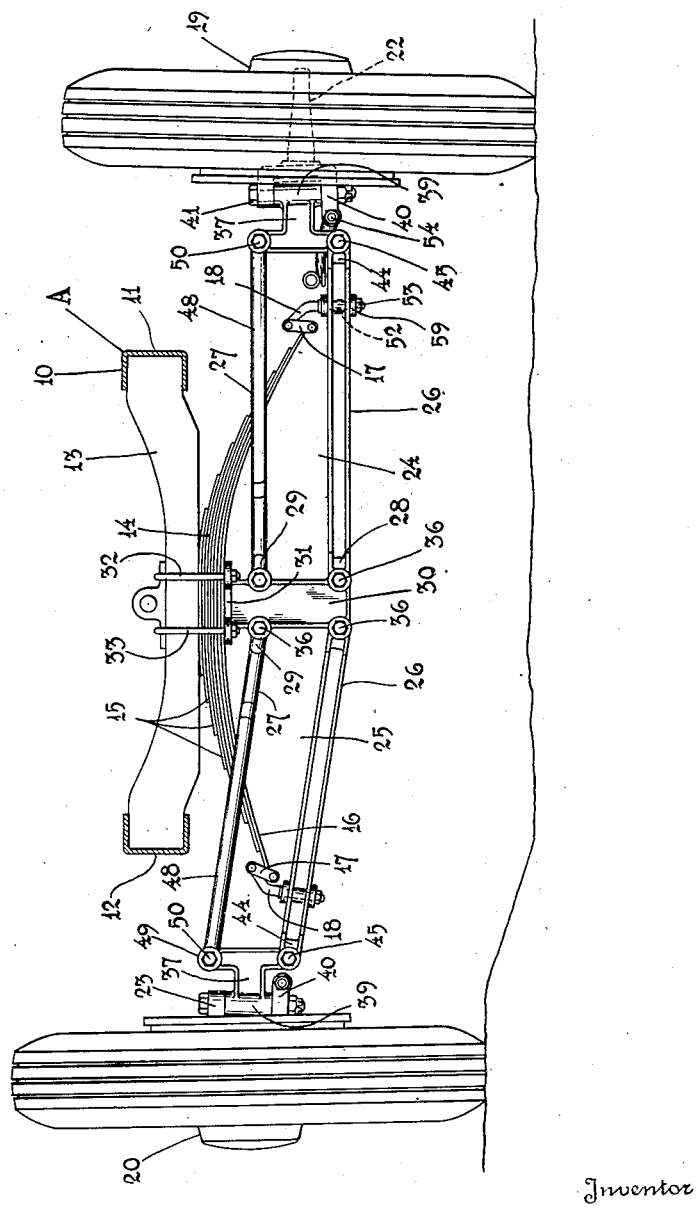
Fig. 1 is a front elevational view of a portion of a vehicle, illustrating an embodiment of my invention.
Figure 2:
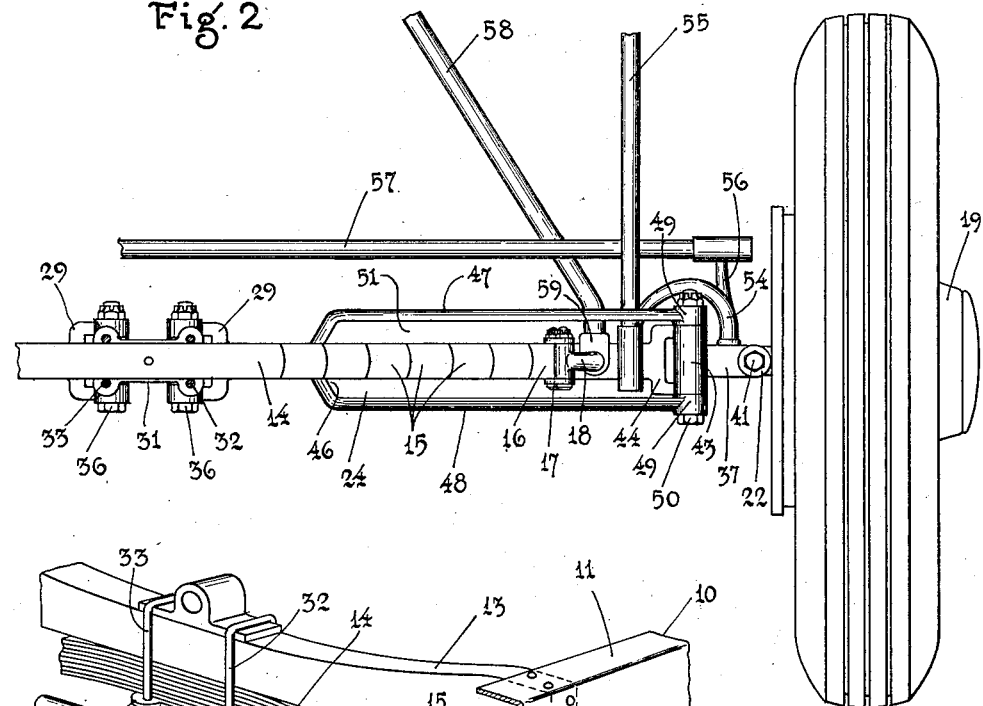
Fig. 2 is a plan sectional view of a portion of the structure shown in Fig. 1 and drawn to a somewhat larger scale.

In certain well known vehicles utilizing a transverse leaf spring for supporting the vehicle frame and body on the supporting wheels, the front wheels are connected together through a single rigid axle and the springs connected to said axle through suitable spring perches and shackles. The present invention provides a construction which may be applied to such types of vehicles without appreciably reconstructing the same, and by means of which independent action of the front wheels may be had.

Inasmuch as the invention is concerned only with the construction for supporting the frame and body of the vehicle on the supporting wheels, the body and power plant of the vehicle have not been shown.

For the purpose of illustration, a vehicle A has been shown, which includes a frame 10 having longitudinal frame members 11 and 12 and a transverse frame member 13 extending across the forward ends of the frame members 11 and 12 and secured thereto through rivets or any other suitable construction. Immediately below the transverse frame member 13 is arranged a semi-elliptical leaf spring 14 which is constructed with the usual leaves 15, the lower leaf 16 being formed with suitable eyes through which the said leaf may be attached to the axle of the vehicle through shackles 17 and spring perches 18. The vehicle further includes two wheels 19 and 20, which are rotatably mounted on suitable wheel mountings which include knuckles 22 and 23. In the vehicles as ordinarily constructed, the knuckles 22 and 23 are attached to a single front axle which, with the present invention, is dispensed with and a composite axle substituted, which consists of two axle sections 24 and 25.

Figure 3:
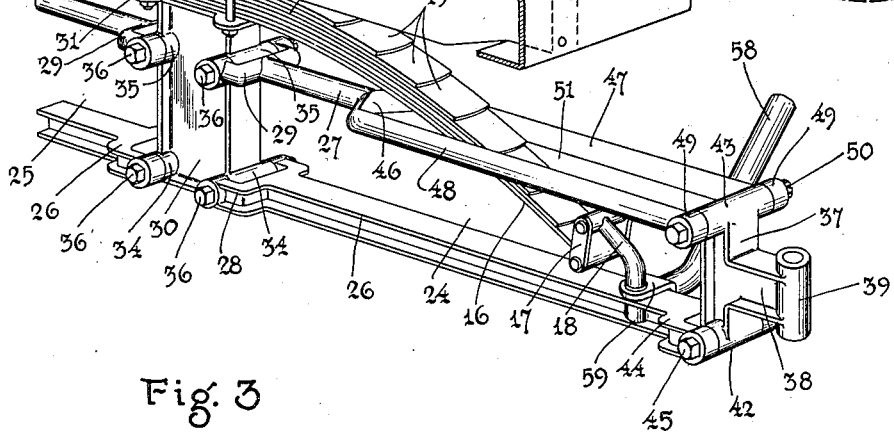
Fig. 3 is a perspective view of a part of the structure shown in Figs. 1 and 2.

Inasmuch as the two axle sections 24 and 25 are identical in construction, only the axle section 24 will be described in detail. The axle section 24 is best shown in Fig. 3 and consists of a lower link 26 and an upper link 27. For supporting these links a vertically extending frame member 30 is employed, which is disposed beneath the transverse frame member 13. This frame member is formed with a plate 31 at the upper end thereof, which plate is adapted to underlie the spring 14. By means of two U-bolts 32 and 33, which pass about the frame member 13 and spring 14, and which also extend through the plate 31, the frame member 30 is rigidly bolted to the frame member 13 and the spring 14 held in position thereby. The frame member 30 serves as a bearing block 30 to pivotally support the inner ends of the two links 26 and 27. For this purpose, the said frame member is formed with four bosses 34 and 35 which are disposed between forks 28 and 29 on the inner ends of the links 26 and 27. Bolts 36, serving as pintles, pass through the said forks and bosses and function in a manner to pivotally support said links for vertical swinging movement. It will be noted that both the links 26 and 27 are disposed below the transverse frame member 13 and also below the leaf spring 14 at its point of attachment to frame 10.

For pivotally connecting the outer ends of the two links 26 and 27 to the wheel mounting, a knuckle bracket 37 is employed, which is best shown in Fig. 3. This knuckle bracket includes a body portion 38 which is formed with a vertically extending boss 39. The boss 39 fits in between a fork 40 formed on the knuckle 22 and is pivoted thereto through the usual spindle bolt 41 which extends jointly through said fork and boss. The bracket 37 is further constructed with two spaced horizontally extending bosses 42 and 43, which are arranged one above the other. The outer end of the link 26 is provided with a fork 44 which receives the boss 42 and is pivoted to said boss through a bolt 45 extending jointly through said boss and fork. The link 27 is bifurcated, as is designated at 46, to provide two spaced arms 47 and 48. These arms terminate in heads 49 which are arranged one on each side of the boss 43. A bolt 50 passes jointly through said heads and boss to pivotally attach the outer end of the link 27 to the knuckle bracket 37.

The leaf spring 14 is attached to the axle section 24 in the following manner: It will be noted that the two spaced arms 47 and 48 provide a space 51 therebetween. This space is of such width that the end of the leaf spring 14 may extend through the space and to a position in proximity to the lower link 26. The spring perch 18 previously referred to and which is connected to the lower leaf 16 of the spring 14 through shackles 17, is constructed with a stud 52 which passes through said link 26 and is attached thereto through a nut 53. By means of this construction, the spring 14 is pivotally connected to the link 26 and is rigidly bolted to the transverse frame member 13 of frame 10.

For the purpose of resisting longitudinal stresses imparted to the wheels 19 and 20 in the operation of the vehicle, a radius rod 58 is employed which is connected at one end to the link 26 and at its other end to some fixed part of the vehicle chassis, not illustrated in the drawings. A clevis 59 is attached to the end of the said radius rod and straddles the link 26. This clevis may be held secured to the said link through the perch 18 and the nut 53 screwed upon the end of the stud 52 thereof. A similar radius rod is provided at the other side of the vehicle.

Steering of the vehicle is effected through the steering knuckle 22. For this purpose a steering arm 54 is employed, which is connected to the knuckle 22. This arm, in turn, is pivotally connected to the end of a steering rod 55, which in turn is connected to suitable steering mechanism whereby the said arm 54 may be rotated through manipulation of the hand steering wheel of the vehicle. Another arm 56 issuing outwardly from the steering arm 54 is pivotally connected to the usual steering tie rod 57.

The manner of installing my invention is as follows: In the type of vehicle in which my invention is to be used the spring 14 is connected in the customary manner to a rigid axle which carries both of the supporting wheels of the vehicle. This axle is disengaged from the two knuckles of the wheels by removing the steering spindle bolts and the two perches 18 are also removed. The said axle may then be detached. Also the plate used for attaching the spring 14 to the frame member 13 is removed and discarded. Instead of the plate so furnished with the vehicle, plate 31 is substituted and the same bolted beneath the spring 14 to hold the bearing block 30 and spring 14 attached to the vehicle frame. Brackets 37 are next attached to the knuckles of the wheels in place of the corresponding structure at the ends of the axle of the vehicle. Links 26 and 27 are then pivoted to the knuckle brackets 37 and the bearing block 30 and thereafter the spring perches, 18 and the radius rods 58 may be attached to the links 26 in exactly the same manner as they would have been attached to the axle of the vehicle ordinarily furnished. The vehicle is then ready for use.

The operation of the invention is as follows. Through the action of the two sets of links 26 and 27, the wheels move substantially vertically. By utilizing two axle sections, each wheel operates independently of the other, each end of the spring 14 functioning independently of the other to permit of independent action of the wheels. By the use of the two arms 47 and 48, the spring 14 ordinarily furnished with the vehicle may be utilized without reconstruction and alteration.

The advantages of my invention are manifest. An extremely practical and simple vehicle construction is provided by means of which independent wheel action can be secured. My invention may be readily applied to existing vehicles of certain types without materially reconstructing or rebuilding the same. The invention utilizes most of the parts of the vehicle to which it is to be applied and particularly the spring and wheel mounting structure. The invention can be constructed at a nominal cost and can be easily and quickly applied.

Changes in the construction of my invention may be made within the scope of what is claimed, without departing from the spirit of my invention.

Having described my invention, what I claim as new and desire to protect by Letters Patent, is:

1. In a vehicle having a transverse frame member, a bearing block depending from said frame member, opposed sets of upper and lower parallel links underlying said frame member and pivoted at their inner ends to said block, a semi-elliptical spring interposed intermediately thereof between said frame member and bearing block and disposed with its end portions curved downwardly beneath the upper links, means for clamping the spring to said frame member, said means including said bearing block as an element thereof, shackles connecting the ends of said spring with said lower links, a bracket pivoted to the outer ends of the parallel links of each set, a wheel mounted on each bracket, said lower links being underslung from their respective wheels through their respective brackets.

2. In a vehicle having a transverse frame member, a bearing block depending from said frame member, opposed sets of upper and lower parallel links underlying said frame member and pivoted at their inner ends to said block, the upper link of each set having horizontally spaced arms, a semi-elliptical spring clamped intermediately thereof between said frame member and bearing block with the end portions of said spring curved downwardly between the arms of the upper links, underslung shackles connecting the ends of said spring with said lower links, a bracket pivoted to the outer ends of the parallel links of each set, a wheel mounted on each bracket, said lower links being underslung from their respective wheels through their respective brackets.

3. In a vehicle, a frame including a transverse member and a bearing block, a transverse leaf spring underlying the transverse frame member, means for clamping said spring intermediately thereof to said frame member, said means including said block as a clamping element, a pair of wheel supporting structures pivotally attached to the frame and extending outwardly therefrom in opposite directions at either side of the block, each wheel supporting structure including upper and lower parallel links and a wheel bracket pivoted to the outer ends of said links, the lower link of each wheel supporting structure being pivoted at its inner end to said bearing block, each end of said spring terminating beneath the upper link of its corresponding wheel supporting structure and connected to such structure near the outer end thereof above the lower link.

4. In a vehicle, a frame including a transverse member and a bearing member therebeneath, a transverse leaf spring interposed intermediately thereof between said frame member and bearing member and supporting the frame through said frame member, a pair of wheel supporting structures pivotally attached to the frame and extending outwardly therefrom in opposite directions, each wheel supporting structure including upper and lower parallel links and a wheel bracket pivoted to the outer ends of said links, the lower link being pivoted at its inner end to said bearing member, each end of said spring terminating beneath the upper link of its corresponding wheel supporting structure and connected to such structure near the outer end thereof above the lower link and beneath the wheel axis.

ROBERT P. SCHLIRF.